July 6, 1965    F. P. CROUCH ETAL    3,192,809
ROTARY CUTTING APPARATUS
Filed May 27, 1963    7 Sheets-Sheet 3

INVENTORS
Fred P. Crouch
Wilbur M. Lockrow
BY *Larson and Taylor*
ATTORNEYS July 6, 1965 F. P. CROUCH ETAL 3,192,809
ROTARY CUTTING APPARATUS
Filed May 27, 1963 7 Sheets-Sheet 5

INVENTORS
Fred P. Crouch
Wilbur M. Lockrow
BY Larson and Taylor
ATTORNEYS

United States Patent Office 3,192,809
Patented July 6, 1965

3,192,809
ROTARY CUTTING APPARATUS
Fred P. Crouch and Wilbur M. Leckrow, Winston-Salem, N.C., assignors, by mesne assignments, to Hanes Corporation, Winston-Salem, N.C., a corporation of North Carolina
Filed May 27, 1963, Ser. No. 283,252
8 Claims. (Cl. 83—100)

The present invention relates to apparatus for the cutting of cloth into blanks for subsequent sewing into garments.

As is well known, such cutting has been extensively done by placing one or more layers of finished cloth in web form on a table, marking cutting lines on the uppermost layer through the use of patterns or charts, and then cutting vertically through all of the layers of cloth as marked with manually or electrically driven knives or scissors. Occasionally, preformed stamping guides were used in specially developed reciprocating presses.

The well known layer method is of course useful, but it does have several disadvantages. These include, for example, the extensive time required to "set up" and the inevitable size variation from layer to layer within one cutting, particularly in the stacks having a large number of layers. Moreover, because of normal color variations in dyeing, matching from the stacks of cut blanks used for the individual garments required time. On the other hand, the reciprocating presses could only be used for limited and special jobs where production and waste were unimportant factors.

Our invention overcomes many of these difficulties, in that it reduces the number of man-hours required for "set-up" and operation. For use particularly with repeating patterns, such as T-shirts and pull-over shirts, groups of blanks for individual garments are cut and stacked together, thereby eliminating color variations and providing a rapid collection for subsequent sewing. Where earlier operations required at least one and preferably two or three operators for each cutting and stacking operation, our invention need require only one operator for several operations.

The present invention contemplates the continuous cutting of garment blanks from woven and particularly knitted cloth rolls, accordian stacks or other sources, by using rotary guide and cutting rollers and subsequently stacking the garment blanks in proper order while simultaneously removing scrap or waste portions.

An important object of the invention therefore resides in the provision of an apparatus enabling the continuous cutting of garment blanks for subsequent sewing into a complete garment, and arranging the blanks in a proper stack.

A further object of the invention resides in the provision of an apparatus for automatically and continuously cutting the garment blanks from cloth and particularly knitted cloth webs.

Yet another object is in the provision of an apparatus enabling ready and automatic removal of the scrap parts while subsequently enabling proper stacking of complete sets of blanks for individual garments.

Still another object resides in the provision of a cutting roller which can cut all of the blanks necessary for the subsequent formation of the garment, and which roller may be adaptable for various patterns and operating sequences.

Yet other objects and advantages of our invention will become apparent during the description of the preferred embodiments as described and shown in the attached drawings, in which like numerals represent like parts throughout, and in which.

As shown in the preferred embodiment, FIGS. 1–10, the invention includes a conveyor system generally designated 1, a cutting roller 2, a counter-pressure roller 3, a scrap removal system 4, a garment blank transfer system 5, a receptacle and indexing conveyor system 6.

The conveyor system 1 generally comprises an endless belt 7, and for reasons as hereinafter described, preferably of stainless steel having a hardness of 38–40 Rockwell "C," with a thickness at the center of .0322 inches, a taper to the edges to a width of .0318 inches, and for knitted cloth, a width of about 26 inches. The endless belt 7 is driven by the end drive wheels 8 and 9, with lateral alignment of the belt 7 being maintained by the flexible V-belts 10 (FIGS. 1 and 7) bonded to the inner surface of the belt 7 (FIG. 7) and cooperating with the grooves 11 and 12 in the drive wheels 8 and 9. Drive wheels 8 and 9 in turn are mounted by suitable bearing supports 13 and 14 on frame 15. Wheels 9 are driven at a constant preselected speed through motor 16 and chain drive and sprockets 18, while wheels 8 idle at the preselected speed. The diameters of the drive wheels 8 and 9 are sufficiently large to prevent stressing by bending of the stainless steel belt 7, for example 34 inches in diameter. The frame 15 in turn is supported by the vertically adjustable legs 19. Both ends of the bearing support 13 for wheels 8 are mounted on horizontally slidable L-plates 20 bolted to the frame 15 by suitable bolts through horizontal slots in the L-plates 20. The L-plates 20 are adjustably positioned horizontally by the screw adjustments 21 acting against the vertical surface of the L-plates 20, thereby enabling proper adjustment of the wheels 8 for proper tensioning of the conveyor belt 7. The outer surface of the belt 7 may be roughened by sandblasting in order to ensure a good lay of the cloth.

Intermediate the drive wheels 8 and 9 is the cutting system including the cutter roller 2, the pressure roller 3 and the scrap removal system 4.

Figures 7, 8:
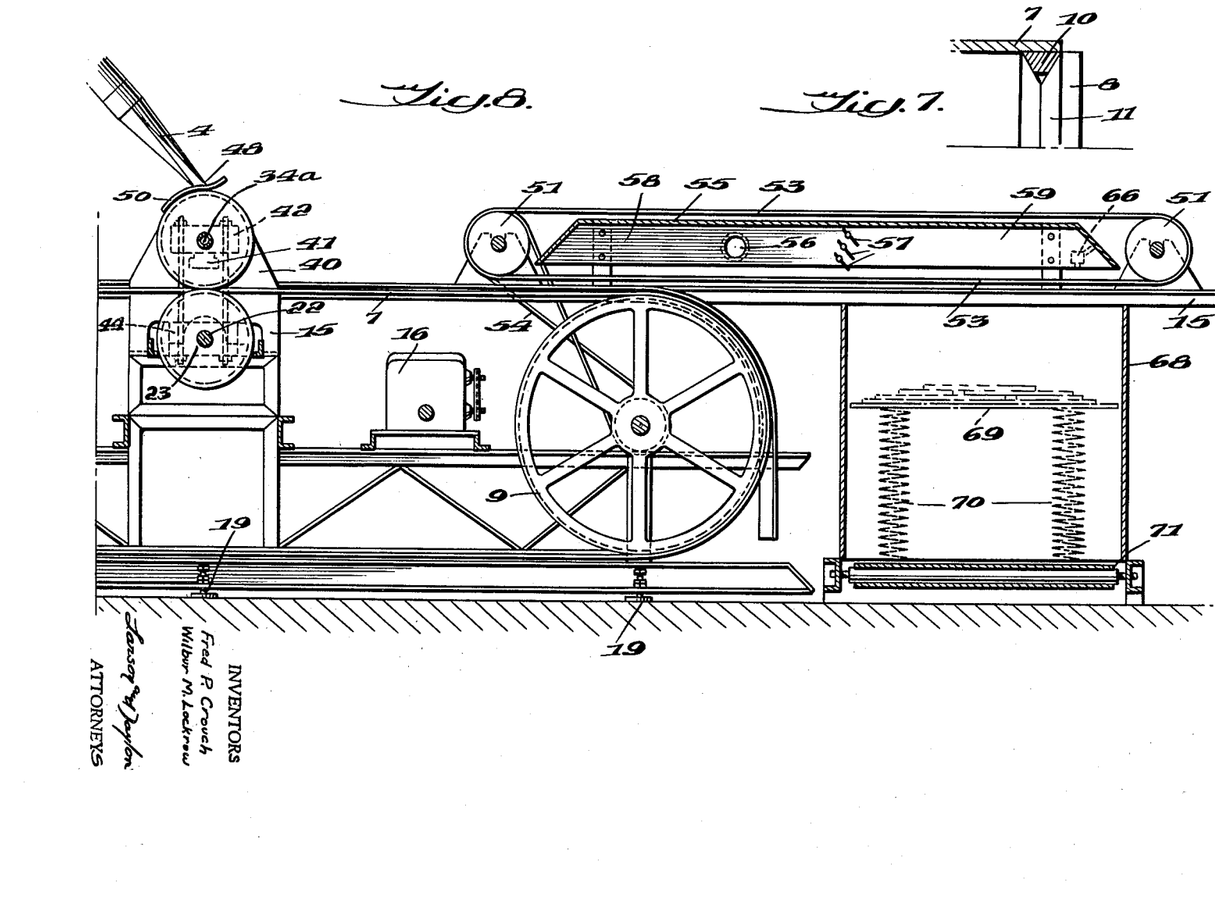
FIG. 7 is a detail view showing the belt alignment means.
FIG. 8 is a sectional view taken on line 8—8 of FIG. 4.

In the preferred form for this assembly, the pressure roller 3 is mounted for rotation by an integral shaft 22 in turn carried by the bearing housings 23. The bearing housings 23 are fixed to the frame 15 as shown in FIG. 8. Rotation of the pressure roller 3 is accomplished by the chain and sprocket drive 24 as shown with a peripheral speed equal to the linear speed of the belt 7, as driven by the drive wheels 9.

The pressure roller 3 comprises a drum 25 having its outer ends 26 at a greater diameter, with the center transverse portion carying the belt 7 recessed no more than and preferably slightly less (.006 inches) than the thickness of the belt 7 at its center. Provision of V-grooves 27 is also made for reception of the V-belts 10.

The cutter roller 2 generally comprises a drum 28 having a hollow central portion 29 and radial openings 30 extending from the central portion 29 to a portion of the periphery 31 of the drum. Circular end plates 32, 33 of larger diameter are bolted onto the drum 28, or threaded thereon by utilizing the central portion 29. End plates 32, 33 include outwardly extending stub shafts 34, 35 integral therewith. One of the end plates 32 and its corresponding stub shaft 34 include a central bore 34a communicataing directly with the hollow center 29 of the drum 28.

Snugly fitting over the drum 28 and covering the peripheral drum portion 31 having the radially extending holes 30 is a sleeve member 36. The sleeve member 36 may be a single cylindrical unit having an outer circumference equal to the pattern repeating length, or may include sectional portions bolted to the periphery of the drum 28. In this manner, the sleeve 36 can be removed, and others of different patterns having the same repeating length, replaced.

Figure 1:
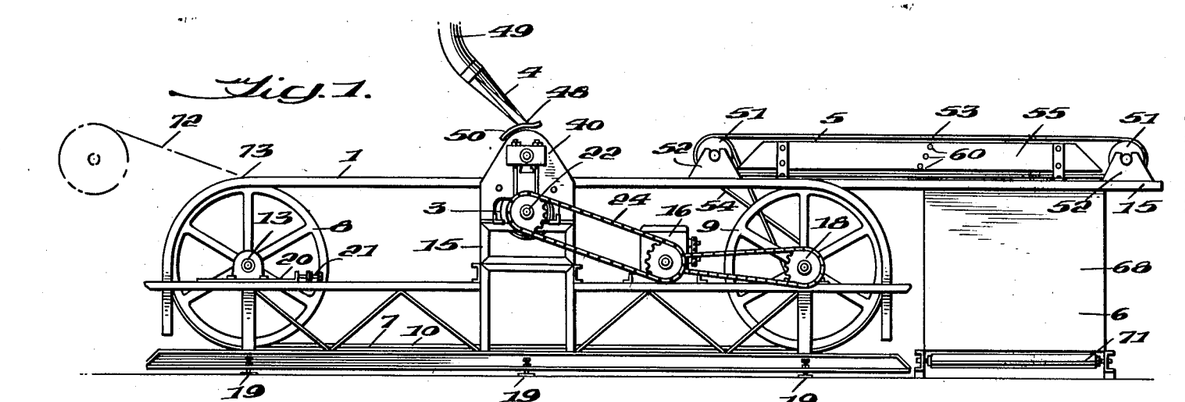
FIG. 1 is a side view of the apparatus in the preferred embodiment.
Figure 2:
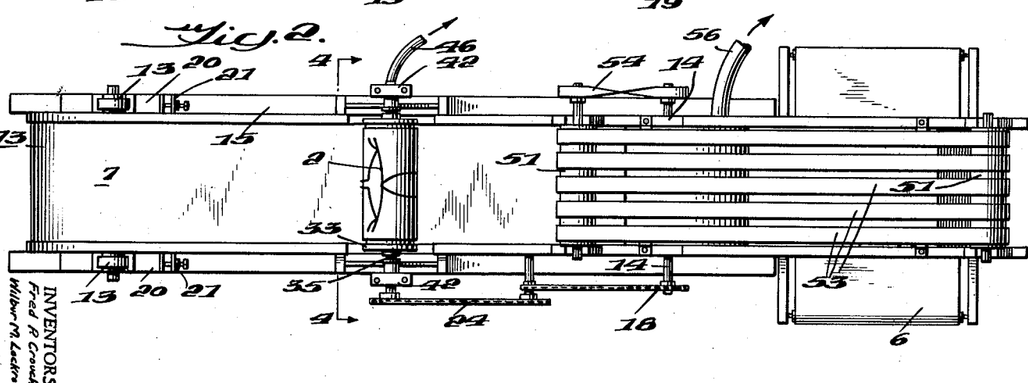
FIG. 2 is a top view with the scrap removal system removed for clarity.
Figures 3, 6:
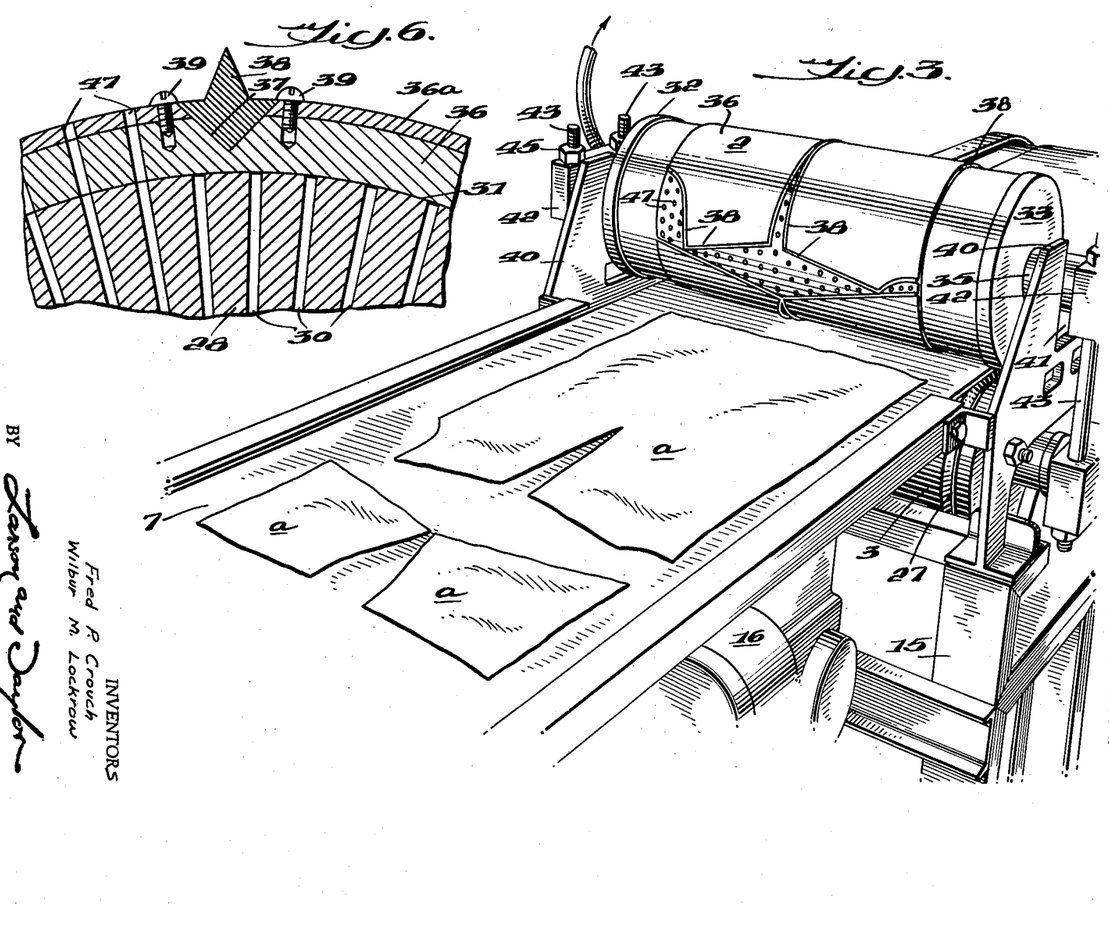
FIG. 3 is a partial perspective view of the cutting apparatus.
FIG. 6 is a partial sectional view showing the cutter blade assembly.

The composite sleeve 36 is grooved according to the pattern to be cut, as shown in part in FIGS. 3 through 6, and each groove 37, as shown, is in the form of a 90 degree V-cut. Within each groove 37 is an elongate cutter blade 38 formed from lengths of 3/32 inch square tool steel shaped according to the cross-section shown in FIG. 6 to form a 45 degree included angle at the cutter edge. The blades 38 in turn are fixed to the sleeve 36 in the grooves 37 by the heads of screws or bolts 39 spaced along the length of and adjacent the groves 37 as shown in FIG. 6. We have determined that a 45 degree angle is optimum, in that blade life is extended, long transverse cuts in cloth are still possible, and warping and nicking is reduced.

The sleeve 36, while itself of hard, non-resilient material, may be further hardened at its surface by known metallurgical means, as shown at 36a, in order to prevent any possibility of transverse slipping of the blades 38 in their respective grooves 37.

Figures 9, 11, 12:
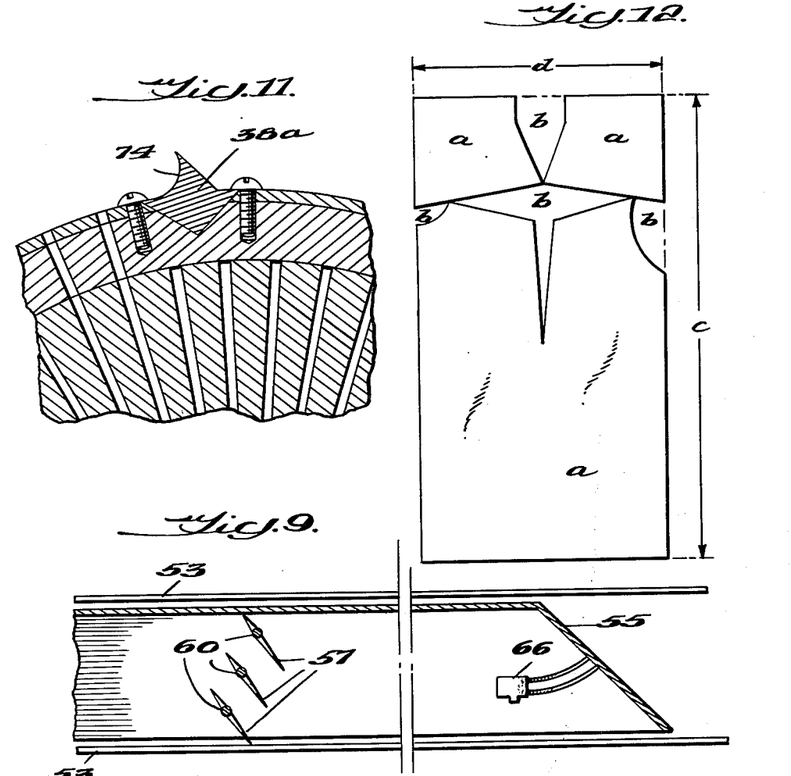
FIG. 9 is a sectional detail showing the detector and vacuum breaker valve apparatus.
FIG. 11 shows an alternate arrangement for the cutter blade assembly.
FIG. 12 is a pattern layout of a typical T-shirt suitable for use with this invention.

As an example of the pattern, FIG. 12 shows a layout for the manufacture of a T-shirt, wherein (a) represents the garment blank portions and (b) represents the intermediate waste portions. The pattern is cut from a double thickness web formed from a flattened tube of circular knit material. The width of the pattern and the web is shown as (d) and the length as (c). The dimension (c) is herein referred to as the repeating length; and for a maximum savings of material, the transverse cuts of two adjacent patterns can be made simultaneously by the same blade 38. Thus, the dimension (c) represents the circumference of the cutter roller 2, with an adjustment ratio of about .977 to compensate for the blade thickness.

The assembled cutter 2 is mounted between the thrust plates 40 fixed to frame 15 with the stub shafts 34, 35 extending through the open slots 41 formed within the thrust plates 40. A floating collar 42 is provided for each of the stub shafts 34, 35, which collars provide the bearing surfaces for rotation of the cutter roller 2. A pair of tension bars 43 connects each of the floating collars 42 to an additional collar 44 mounted on the shaft 22 of the pressure roller 3. The tension between the cutter roller 2 and the pressure roller 3 is adjusted by the nuts 45 threaded on the tension bars 43 as shown.

Figure 4:
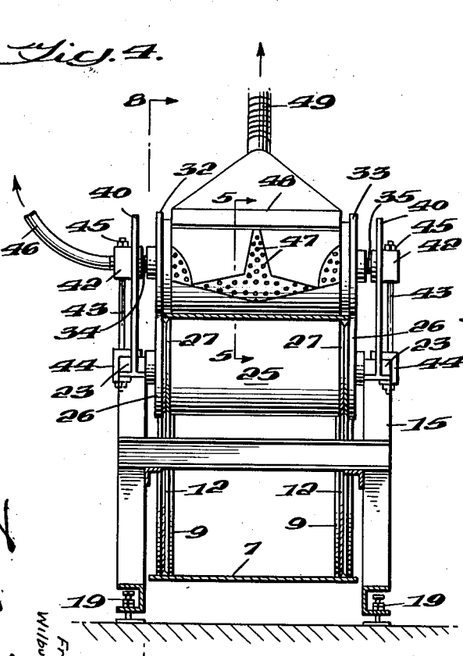
FIG. 4 is a sectional view taken on line 4—4 of FIG. 2.
Figure 5:
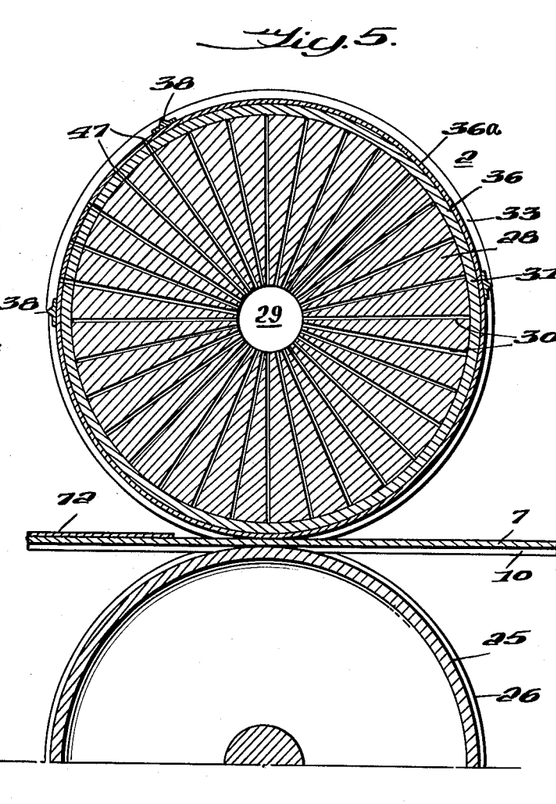
FIG. 5 is a sectional view of the cutter roller taken on line 5—5 of FIG. 4.

From FIGS. 4 and 8, it can be seen that the rims of end plates 32, 33 of the cutter roll frictionally engage the rims of the end portions 26 of the pressure roller 3, with the belt 7 passing the recessed bite therebetwen. The thrust plates 40, or included thrust collars between the plates and the cutter roller (not shown), provide for positive transvere alignment of the roller to prevent transverse motion during operation of the apparatus. Where thrust collars are provided, such thrust collars can be positively adjustable for various longitudinal and vertical positions in a known manner to ensure positive transverse alignment.

The cutter roller 2 is rotated at a peripheral speed equal to that of the pressure roller 3 by the friction drive between the circular end plates 32, 33 and the end portions 26 of the pressure roller 3. Thus, it can be seen that, for patterns of different repeating length, the entire cutter roller 2 can be removed and others of different diameter replaced in the open slots 41 and collars 42. Moreover, the driving arrangement is not disturbed, or need not be altered, since the frictional drive ensures an equal peripheral speed for the cutter roller 2, independent of its diameter.

A vacuum hose 46 is attached to the stub shaft 34 and end plate 32 having the central bore 34a, and a suitable vacuum source (not shown) is provided for communication through the hose 46 and end plate 32 to the center of the drum 28. Corresponding holes 47 are provided in the sleeve 36 only at the areas of the waste portions of the material intermediate the garment blanks, which holes are in alignment with corresponding radial holes 30 of the drum 28. The remaining radial holes 30 are blocked off by the sleeve 36, such that only the waste portions of the cut web of cloth will attach themselves by the vacuum to the cutter roller 2 for rotation therewith.

The scrap removal system 4, partially shown here, includes a nozzle shaped opening 48, extending in the direction of the attracted scrap on the cutter roller 2 as it approaches the nozzle 48 and across the width of the cutter roller 2, and suitable duct work 49 connecting the nozzle 48 to a high velocity vacuum system (not shown). The vacuum system provides sufficient velocity through the nozzle 48 for removal of the scrap held by the lesser vacuum of the cutter roller 2. In order to ensure a proper flow of air, there is provided a two inch head portion, with the opening spaced 3/8" from the periphery of the cutter roller 2. A trailing portion 50 of rigid material spaced 1/16" from the periphery or of flexible material riding the periphery is also provided. The material scraps may then be conveyed through the connecting duct work to scrap container (not shown). The positioning of the nozzle 48 can be accomplished by the use of known flexible ducting and positive-positioning friction linkages.

At the delivery end of the conveyor 7 after cutting of the blanks is the transfer system 5. The transfer system 5 comprises a pair of end rolls 51 mounted for rotation on end supports 52 fixed to the frame 15. Passing around the rolls 51 are a plurality of transversely spaced narrow, endless belts 53; and driving of the belts 53 is accomplished by a drive belt 54 mounted as shown, or in any similar manner, such that the direction of movement of the belts 53 at their lower positions is the same as the direction of movement of the stainless steel belt 7. Preferably, the driving means is fixed such that the linear speed of the narrow belts 53 is slightly greater than the linear speed of the stainless stel belt 7.

In the area between the rolls 51 and the narrow belts 53 is a sheet metal hood 55, which hood is open at the bottom and has a hose 56 connecting it to a suitable vacuum source (not shown). Thus, as vacuum is supplied to the hood 55 through the vacuum source, any cut garment blanks on the stainless steel belt 7 will attach themselves to the narrow belts 53 through the vacuum as air passes between the spaced belts. By having the narrow belts 53 at a slightly greater linear speed, the tendency of the blanks to wrinkle as they transfer can be eliminated. Obviously a single perforated belt can be used, but spaced narrow belts have the advantages of inexpensive replacement and easier alignment.

Figure 10:
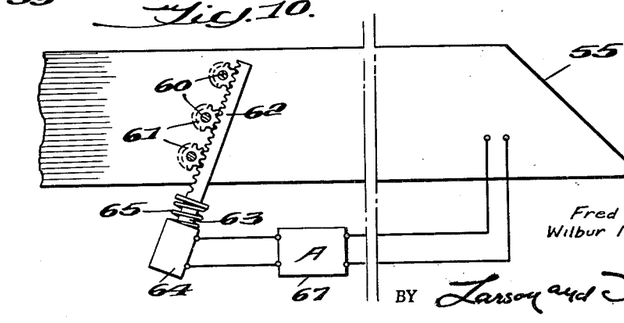
FIG. 10 is a detail of the valve control mechanism.

Within the hood 55 are a plurality of flapper valves 57 extending along the entire transverse width of the hood 55, which valves divide the hood 55 into a receiving portion 58 and a depositing portion 59. When closed the valves 57 will cut off the vacuum within the depositing position and any blanks at that portion will fall by gravity. These flapper valves 57 are made of slightly flexible material to ensure a tight closure. The valves 57 are pivoted about their respective shafts 60, and are positioned by means of the pinion gears 61 and common rack 62 as shown in FIG. 10. The rack 62 is fixed to the armature 63 of an electro-magnetic solenoid 64, which when activated, draws the armature 63 downwardly against the bias of the spring 65 shown. This motion closes the flapper valves 57, while on deactivation, the force of the spring 65 urges the armature 63 upwardly again to pivot the flapper valves 57 to the open position.

While any suitable detector means may be provided, as shown here, a photoelectric detector 66 from within the hood 55 is directed toward a space between the belts 53 to detect the presence of any material being carried by the belts. Upon detection and suitable amplification as schematically shown at 67 in FIG. 10, the solenoid 64 is activated to close the flapper valves 57 and cut off the vacuum at the depositing portion 59 of the hood. The cut blank is thereby released and may fall by gravity into the receptacle 68.

In order to prevent wrinkling of the blanks as they fall from the transfer system 5, the receptacle 68 may be provided with a platform 69 mounted on weak springs 70 as shown. Thus, the height of the platform 69 is determined by the weight of blanks already received thereon, and subsequent blanks need fall only a short distance.

The receptacle 69 itself is supported on the roller system 71 and may be moved out of position by hand and another receptacle substituted, or such removal be accomplished by means of a known indexing means when the receptacle receives the appropriate number of blanks. Such indexing may be accomplished by a counting of the number of times of operation of the photoelectric control system or by a weight measurement on the rollers 71. In this manner, transfer of the receptacle 68 may be accomplished by using positive driving rollers during operation of the indexing system.

In the operation of the invention as described in the preferred embodiment, a web of cloth 72, suitably knit material of the gauge used for T-shirts, undershirts, etc., (.032 inch thick) is rolled or stacked in accordion layers at the receiving end 73 of the apparatus. This portion of the belt may vary in length depending on the necessary inspection or pre-cutting station. The forward end of the cloth 72 is aligned at some suitable marking on the belt 7 for proper cutting and the machine motor drive is turned on. The stainless steel belt 7 delivers the web of cloth 72 to the cutter roller 2, and after cutting the selected cut blanks for the finished garment proceed on the belt 7, while the intermediate scrap material is held to the cutter roller 2 for subsequent transport to the scrap removal system 4. As the cut blanks approach the transfer conveyor belts 53, the vacuum applied to the transfer system 5 lifts the cut blanks from the stainless steel belt 7 and holds them against the transfer conveyor belts 53. Thereafter, as each cut blank approaches the detector system, the electro-magnetic solenoid 64 operates to close the flapper valves 57 and cut off the vacuum at the deposition portion 59 above the receptacle 68, at which time the blank is dropped into the receptacle.

Thus it can be seen that cutting may now be done continuously with a single operator for one or a group of such machines. For changes in the patterns to be cut, only the cutter roller 2 need be removed, and according to the disclosed embodiment, the driving means need not be disturbed. For patterns utilizing the same diameter of cutter roll, replacement sleeves 36 may also be considered. Moreover, new cutting blades 38 may be inserted at only a moderate expense.

While stainless steel has been described with respect to the belt 7, some materials other than stainless steel may be used, provided they have substantially the same properties. For example, nylon, cellulose acetate, tin, aluminum and galvanized iron were all used, but such were not suitable. It is important that the material be non-resilient, very hard, and non-oxidizing or in any way not contaminative of the cloth. Both the cutter roller 2 and pressure roller 3 are to be of non-resilient hard material and positively positioned in a non-resilient manner.

The cutter roller 2 in the embodiment shown for cutting of T-shirts has a diameter of about 11 inches and weighs approximately 300 pounds. The retaining tension bars 43 are of one inch diameter cold rolled steel and are tightened by the nuts 45 at more than hand-pressure. Thus, the weight of the roller 2 with the negative tolerance described, limited in change of position by the elasticity of the cold rolled steel bars, is sufficient to cut the knitted cloth. However, it is important to note that such positive direct tension through rigidity is necessary with respect to the cutting of closely knit material, and known springs do not provide sufficient force. As an alternative, we have successfully used one or more pressure rolls rotatably mounted in housings on an axis parallel to the cutter roller and acting on the end plates of the cutter roller 2 in axial opposition to and in a manner similar to the action of the pressure roller 3. In this form, the tension bars connect the housings to the collars 44 of the pressure roller 3. A further alternative would be the use of hydraulic or combination hydraulic-pneumatic pressure application means at the roller extremities.

For most knitted cloth, a plane surface on the stainless steel belt 7 may be sufficient. However, the roughened surface by sandblasting can be considered in order to maintain a proper alignment of the web of cloth on the belt.

In the embodiment of the cutter blade shown in FIG. 11, the one surface 74 of the blade 38a facing the intermediate waste portions is made concave with the same included angle of 45 degrees; and by such, the waste portions may be held on the cutter roller 2 by the surfaces 74 around the periphery of each waste portion, thereby eliminating or at least substantially reducing the amount of vacuum necessary for retention of the waste portions on the cutter roller 2 for transfer to the waste removal system 4.

Figure 13:
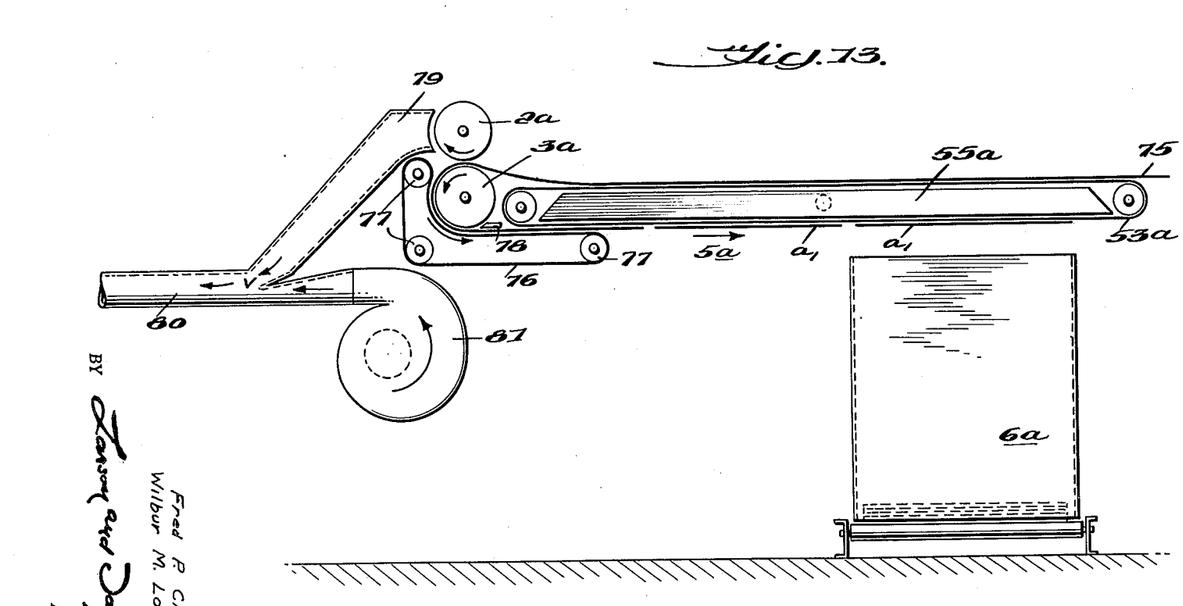
FIG. 13 is a schematic view of a second embodiment of the invention.

In an alternative embodiment of the invention, shown schematically in FIG. 13, the stainless steel conveyor belt is eliminated, and the blank transfer system is further utilized as a cloth web delivery means.

The transfer system 5a, including the spaced narrow belts 53a, hood 55a and associated vacuum and detector systems, and the receptacle and indexing conveyor system 6a are all of the same construction as shown in the preferred embodiment. Similarly, the pressure roller 3a and cutter roller 2a are of the same construction and mounted in the same manner as in the preferred embodiment, except that the center transverse portion of the pressure roller is not recessed to compensate for the conveyor belt, although a similar negative tolerance is desirable.

In this embodiment, the web of cloth 75 is fed by the upper sides of the belts 53a, to the bite between the cutter roller 2a and the pressure roller 3a. As in the preferred embodiment, the vacuum from within the cutter roller 2a attracts the waste, while the blank portions are carried on to the transfer system 5a by means of an endless flexible web belt 76 passing around rollers 77 and driven at a linear speed equal to the peripheral speed of pressure roller 3a and the linear speed of the belts 53a. The belt 76, by pressing against the roller 3a, retains the blanks against the surface of the roller 3a until the blanks adopt a horizontal attitude. To ensure that the blanks do not continue on around the pressure roller 3a, there is provided a peeler bar 78, which peeler rides agains the surface of the pressure roller 3a, in a manner similar to a calendering mechanism for web-forming machines.

The waste is removed from the cutter roller 2a by a waste hood 79 connected through suitable ducting 80 to a high velocity vacuum source 81.

Figures 14, 15:
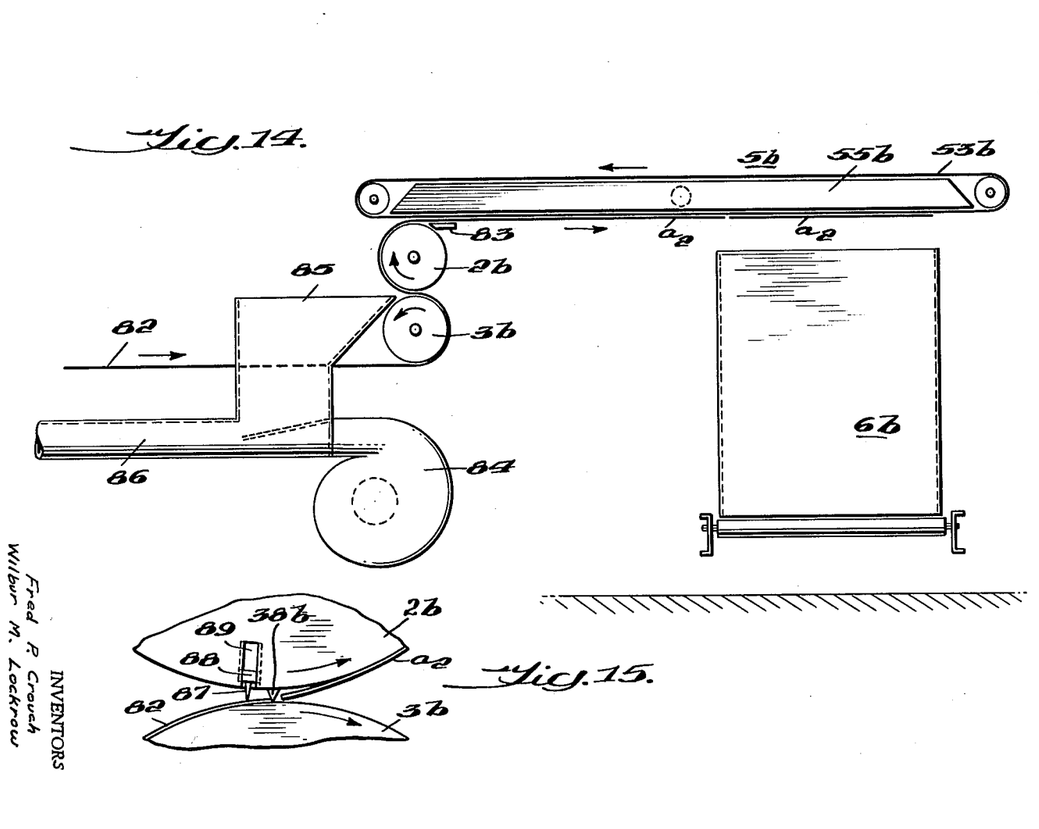
FIG. 14 is a schematic view of a third embodiment according to the invention.
FIG. 15 is a detail of the cutter roller suitable for use with the embodiment of FIG. 14.

In a further embodiment of the invention, as shown schematically in FIGS. 14 and 15, the stainless steel conveyor belt is again dispensed with, and an air pressure system rather than vacuum is utilized within the cutter roller.

As before, the transfer system 5b, including the belts 53b, hood 55b, the associated vacuum and detector system, and the receptacle and indexing conveyor system 6b are all of the same construction as shown in the preferred embodiment. The pressure roller 3b is of the same construction as the pressure roller of the preferred embodiment, except that the center transverse portion, as in the embodiment of FIG. 13, is not recessed for compensation of the conveyor belt.

In this further embodiment, the web of cloth 82 is first fed around the pressure roller 3b, as shown, to the bite between the pressure roller 3b and the cutter roller 2b, where the cutting is accomplished. Behind each transverse cutting blade 38b forming the beginning of a blank portion, there is associated a transverse row of pins 87 attached to a block 88 slidable within a keyed slot 89 formed at the periphery of the cutter roller 2b. As the pins 87 approach the bite between the pressure roller and cutter roller, they drop by force of gravity and are exposed sufficiently to grab the leading edge of the web of cloth 82, as formed by the associated cutter blade 38b. Then, on further rotation of the rollers, the leading edge of the web is carried on around the cutter roller 2b to enable the subsequent cuts for completing another blank portion. As the pins 87 approach the peak of revolution of the cutter roller 2b, they drop to within the slot 89 by gravity to release the associated blank portion. At this point, the blank portions are peeled off by a peeler bar 83 and attracted to the belts 53b of the transfer system 5b. In lieu of the gravity means, the pins 87 may be urged outwardly by suitable spring means within the slot 89, and may be cammed inwardly by a suitable stationary eccentric circle cam at the ends of the cutter roller, with the block 88 functioning as a cam follower.

Waste removal is accomplished by the utilization of another high velocity vacuum source 84, a waste collection hood 85, and associated ducting 86. Instead of the vacuum system within the interior of the cutter blade 2b, as described in the preferred embodiment, an air pressure system is used, sufficient air being provided to blow off the waste from the periphery of the cutter roller at the waste portions thereof and into the waste collection hood 85. In all other respects, the construction according to the embodiment shown in FIGS. 14 and 15 is like that of the preferred embodiment.

It is of course obvious that yet other details of construction can be resorted to without departing from the spirit of our invention or the scope of the subjoined claims.

We claim:

1. Apparatus for continuously cutting a web of knitted or woven cloth into a plurality of repeating garment blank portions, comprising: a hard-surfaced non-resilient pressure roller, and bearing supports mounting the roller for rotation about a fixed horizontal axis; an opposed non-resilient roller mounted for rotation about an axis parallel to the pressure roller axis, the cutter roller having at its periphery raised hard-surfaced cutting edges shaped to form a plurality of garment blank portions from a web of cloth with intermediate waste portions; collar means rigidly holding the cutter roller against the pressure roller; means for rotating the pressure roller at a predetermined peripheral speed with a corresponding rotation of the cutter roller at the same peripheral speed; means for feeding the web of cloth from one side to the bite between the cutter roller and the pressure roller at a linear speed equal to the said peripheral speeds to cut the web of cloth into the blank portions and the waste portions; a vacuum waste disposal system for selectively removing and collecting the waste portions from the cutter roller; belt transfer means including a vacuum system for selectively attracting only the blank portions, and comprising a pair of end rolls, a plurality of spaced parallel endless belts passing around the end rolls and movable between a garment blank receiving section and a garment blank depositing section, a hood mounted within the area confined by the rollers and the belts, the hood being open at the bottom and including port means for communication with a vacuum source to attract the blank portions to the belts through the spaces from below the belts at the receiving section, means for mvoing the belts and the attracted blank portions from the receiving section to the depositing section, flapper valves extending transversely of the hood and intermediate the ends thereof to divide the hood and the belts therebelow into the receiving section and the depositing section, the port means being on the receiving section side of the hood, and means for breaking the vacuum in the hood at the depositing section and releasing the blank portions from the belts when the blank portions reach a predetermined position at the depositing section.

2. Apparatus according to claim 1 wherein the flapper valves comprise a plurality of overlapping and pivotable butterfly sections; and the means for breaking the vacuum comprises solenoid means for closing the butterfly valve sections to restrict communication from the port means to the depositing section, and detector means operable to activate the solenoid means when the attracted blanks reach the said predetermined position at the depositing section.

3. Apparatus for continuously cutting a web of knitted or woven cloth into a plurality of repeating garment blank portions, comprising: a pressure roller, and bearing supports mounting the pressure roller for rotation about a fixed horizontal axis; an opposed cutter roller mounted for rotation about an axis parallel to the pressure roller axis, the cutter roller having at its periphery raised cutting edges shaped to form a plurality of garment blank portions from a web of cloth with intermediate waste portions; means holding the cutter roller against the pressure roller; means for rotating the rollers at the same peripheral speed; means for feeding the web of cloth to the bite between the cutter roller and the pressure roller so as to cut the web of cloth into blank portions and waste portions; a waste disposal system for selectively collecting the waste portions after cutting; a blank transfer system for collecting the blank portions after cutting, said blank transfer system comprising an endless fluid-pervious belt means located to receive said blank portions after cutting, a hood mounted above and adjacent to said belt means, the hood being open at the bottom and including port means for communication with a vacuum source so as to attract the blank portions to the belt means from below the belt means, a normally open, movable partition means extending transversely of the hood and intermediate the ends thereof to divide the hood into a receiving section and a depositing section, said port means being in the receiving section, means for moving said belt means and the attracted blank portions from the receiving section to the depositing section, and means for moving said partition to close off communication between said receiving section and said depositing section when the blank portions reach a predetermined position at the depositing section, thus breaking the vacuum in said hood at the depositing section and releasing the blank portions from the belt means.

4. Apparatus as set forth in claim 3 wherein the endless belt means and the receiving section of the hood are located so as to attract said blank portions directly from the cutter roller after cutting.

5. Apparatus as set forth in claim 3 further comprising conveyor means for delivering the cut blank portions from the rollers to the receiving section of the hood and the endless belt means.

6. Apparatus for continuously cutting a web of knitted or woven cloth into a plurality of repeating garment blank portions, comprising: cutting means for receiving successive portions of a cloth web and cutting said cloth web into a plurality of garment blank portions and waste portions; a waste disposal system for selectively collecting the cut waste portions from the cutting means; and a blank transfer system for collecting the cut blank portions from the cutting means, said blank transfer system comprising an endless fluid-pervious belt means located to receive said cut blank portions after cutting, a hood mounted above and adjacent to said belt means, said hood being open at its bottom and including port means for communication with a vacuum source so as to create a vacuum in said hood to attract said cut blank portions to the underside of said belt means, movable partition means extending transversely of the hood and intermediate the ends thereof to divide the hood into a receiving section and a depositing section, said port means being in the receiving section, said movable partition means being normally disposed so as to communicate said receiving section and said depositing section, means for moving said belt means and the attracted blank portions from the receiving section to the depositing section, and means for moving said partition to close off communication between said receiving section and said depositing section to break the vacuum in said depositing section when the blank portions reach a predetermined position at the depositing section.

7. Apparatus as set forth in claim 6 wherein said endless belt extends around two longitudinal spaced roller members mounted on horizontal axes, said hood being located between the upper and lower runs of said endless belt, and wherein the upper run of said endless belt serves as a conveyor for feeding successive portions of said cloth web to said cutting means.

8. Apparatus as set forth in claim 7 further comprising a conveyor means for conveying cut blank portions from said cutting means to the lower run of said endless belt adjacent said receiving section of said hood.

References Cited by the Examiner
UNITED STATES PATENTS

| | | | |
|---|---|---|---|
| 2,186,594 | 1/40 | Rosenberg | 83—547 |
| 2,244,779 | 6/41 | Howard | 83—547 |
| 2,302,855 | 11/42 | Hallman | 83—346 X |
| 2,413,999 | 1/47 | Shaner | 83—103 |
| 2,416,173 | 2/47 | Halstead | 83—152 |
| 2,486,196 | 10/49 | Nebolsine | 271—74 |
| 2,539,379 | 1/51 | Wright | 83—346 X |
| 2,791,276 | 5/57 | Weller | 83—155 |
| 2,948,381 | 8/60 | Penn | 271—74 X |
| 2,973,960 | 3/61 | Buccicone | 271—74 |
| 3,060,776 | 10/62 | Bobst et al. | 83—103 |
| 3,081,996 | 3/63 | Hajos | 271—74 |
| 3,106,121 | 10/63 | Novick | 83—152 |
| 3,123,354 | 3/64 | Ungerer | 271—74 |
| 3,124,988 | 3/64 | Albert | 83—103 X |

ANDREW R. JUHASZ, *Primary Examiner.*

WILLIAM S. LAWSON, *Examiner.*